United States Patent
Ito et al.

(10) Patent No.: US 6,809,908 B1
(45) Date of Patent: Oct. 26, 2004

(54) LIGHT INDUCTION TYPE THIN FILM MAGNETIC HEAD

(75) Inventors: Kenchi Ito, Kokubunji (JP); Hideki Saga, Fuchu (JP); Hiroaki Nemoto, Kokubunji (JP); Tomohiro Okada, Enschede (NL)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/069,668
(22) PCT Filed: Mar. 10, 2000
(86) PCT No.: PCT/JP00/01474
§ 371 (c)(1),
(2), (4) Date: May 20, 2002
(87) PCT Pub. No.: WO01/67443
PCT Pub. Date: Sep. 13, 2001
(51) Int. Cl.[7] .............................. G11B 5/39; G11B 11/14
(52) U.S. Cl. ................... 360/317; 369/13.13; 369/13.17
(58) Field of Search ................................ 360/317, 125, 360/126, 114, 119; 369/13.32, 13.34, 13.13, 13.17, 13.24

(56) References Cited

U.S. PATENT DOCUMENTS 5,986,978 A * 11/1999 Rottmayer et al. ...... 369/13.17
6,016,290 A * 1/2000 Chen et al. .............. 369/13.17

OTHER PUBLICATIONS

Nikkei Electronics, No. 734, pp. 35–42, Jan. 11, 1999.

* cited by examiner

Primary Examiner—David Ometz
(74) Attorney, Agent, or Firm—Antonelli, Terry, Stout & Kraus, LLP

(57) ABSTRACT

A light induction type thin film magnetic recording head according to the present invention includes a lower magnetic core (2) formed on a substrate, an upper magnetic core (6) whose front end part is connected to the lower magnetic core through a magnetic gap film and whose rear end part is directly connected to the lower magnetic core with a back contact part (11) formed of a magnetic substance, and an insulating layer (3) formed between the upper magnetic core and the lower magnetic core, characterized in that an optically transparent waveguide part (5) whose width is smaller than the width of the upper magnetic core and whose thickness is thinner than the thickness of the upper magnetic core is buried in the upper magnetic core, and a coil (8) which generates magnetic flux in a magnetic circuit composed of the upper magnetic core, lower magnetic core, magnetic gap, and back contact part is arranged around the back contact part.

24 Claims, 9 Drawing Sheets

FIG.1A
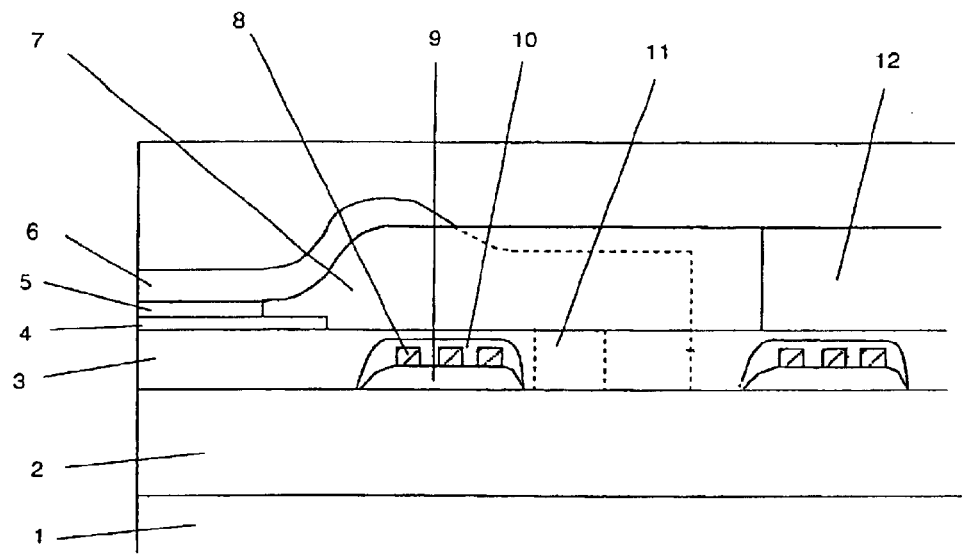
FIG.1B
FIG.1C
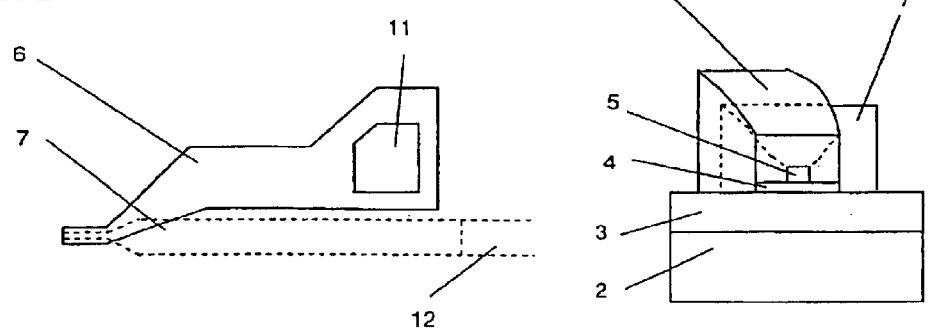

Point A   Disk running direction

Track width

Temperature rise due to DC light irradiation

Point A

Vertical component of magnetic field

LIGHT INDUCTION TYPE THIN FILM MAGNETIC HEAD

TECHNICAL FIELD

The present invention relates to an information recording and reproducing apparatus, which uses a recording medium which stores information by a reversed magnetic domain on a vertical magnetic recording film formed on a surface of a substrate, records information by forming a reversed magnetic domain in the recording medium, and reproduces information by detecting magnetic leakage flux from the recording medium, and an induction type thin film magnetic head mounted thereon.

BACKGROUND OF THE INVENTION

The miniaturization of the bit length and truck size of a record bit has been enhanced with the high densification of recording of a magnetic disk unit. While a recording area of an in-plane magnetic recording medium is miniaturized, the demagnetization by heat magnetic relaxation is posing a large problem, and hence, investigation of the high densification by the conversion of a recording method is accelerating. Herein, vertical magnetic recording recently attracts a lot of attention as a next-generation recording method since it has such theoretical advantages for the high densification that heat magnetic relaxation cannot easily happen since a comparatively thick recording medium can be used, and that record magnetization is stabilized as recording density is increased.

As one of the vertical magnetic recording methods, for example, as mentioned in Nikkei electronics, No. 734, Jan. 11(1999), pp. 35–42, there is a method of recording information by heating an amorphous optical magnetic medium by irradiating the medium with light, and forming a reversed magnetic domain, and reproducing information by detecting magnetic flux leaked from the magnetic domain by using a reproducing head such as a GMR (Giant Magneto Resistance) head (a first conventional example). This first conventional example has such advantages that it is possible to miniaturize an apparatus since it is possible to arrange both an optical head and an magnetic head in one side of a recording medium according to the head using this technology since the head where an SIL (Solid Immersion Lens) where a coil for a magnetic field modulation that generates a magnetic field for record is formed in a central part of a bottom face of a floating slider in a rear end part of which a GMR is formed is used, or that the flexibility of film configuration of the recording medium increases since it becomes unnecessary for the recording medium to have a light transmission in a wavelength band of a light source. As for a shape of a recording medium, a card-like shape or a disk-like shape is general geometry. Furthermore, Japanese Patent Laid-Open No. 5-54422 (a second conventional example 2) discloses an example that all of an optical waveguide layer in which a laser diode and a photo diode, and a Fresnel lens and a beam splitter are formed, and a magnetic head which is near the Fresnel lens and includes a magnetic core and a magnetic coil are installed on a face of the floating slider that opposes the medium.

In the above-described first conventional example, a recording head using an SIL and a reproducing head such as a GMR are installed in different locations. In a common magnetic recording apparatus, a floating slider is attached at the tip of a swing arm rotating with centering a certain point, and the head is made to access to a predetermined information track. Therefore, in an outer peripheral part of a record disk, some discrepancy arises in a central line of the floating slider, and a tangential direction of the information track. Then, in the case that the distance between the recording head and reproducing head is large as the first conventional example, there arises a problem that an information track, on which the recording head is performing recording, and an information track from which the reproducing head performs reproduction are different tracks. In order to make the recording head and reproducing head approach, although the miniaturization of the recording head using an SIL is indispensable, the first conventional example has an issue that the shrinkage of the recording head is difficult since an area of at least 10 $\mu$m or more which makes light penetrate is required for the bottom face of the SIL and the magnetic coil is large. In addition, since the magnetic coil is large, there is also another issue that an operating speed is slow and a recording speed is slow as a result. Furthermore, since a spin valve type magnetic sensor used for reproduction had a rectangle shape nevertheless the geometry of a bit recorded was a crescent shape since a circular optical spot condensed with a lens was used as irradiation light, there was also still another problem that resolution greatly decreases at the time of reproduction.

In addition, in the second conventional example, a location of an optical spot condensed by the Fresnel lens and a location where a magnetic field is applied by the magnetic coil are separated. In the case of such structure, even if an area heated by the optical spot was small, temperature distribution spread by heat conduction as it separates from the optical spot, and the temperature distribution spread in a magnetic field application area, and hence, there was a problem that it was difficult to record a small record bit.

DISCLOSURE OF THE INVENTION

An light induction type thin film magnetic recording head according to the present invention comprises an angular U-shaped magnetic core having a gap on a face opposing a recording medium to be recorded, a coil generating magnetic flux in the direction perpendicular to a face of the recording medium so that a magnetic core may be surrounded, and an optical waveguide part near the magnetic core following the gap, radiates light on the recording medium by the optical waveguide part, and applies magnetic flux, generated by magnetic flux generating means, by the magnetic core. According to this configuration, since an irradiation location of light with power required for recording and a location of applied magnetic flux overlap or approaches appositionally on a recording medium, it is possible to realize magnetic domain recording in high-density and high-speed. The optical waveguide part may be constituted inside a magnetic circuit having a magnetic core, or may be provided near a magnetic core outside a magnetic circuit. A minute recording magnetic domain can be formed by provision near the magnetic circuit.

In a specific light induction type thin film magnetic recording head according to the present invention, in an induction type thin film magnetic head comprising a lower magnetic core formed on a substrate, an upper magnetic core whose front end part is connected to the lower magnetic core through a magnetic gap film and whose rear end part is directly connected to the lower magnetic core with a back contact part formed of a magnetic substance, and an insulating layer formed between the upper magnetic core and the lower magnetic core, an optically transparent waveguide part whose width is smaller than the width of the upper magnetic core and whose thickness is thinner than the thickness of the upper magnetic core is buried in the upper magnetic core, and a coil which generates magnetic flux in a magnetic circuit composed of the upper magnetic core, the lower magnetic core, the magnetic gap and the back contact part is formed around the back contact part. Furthermore, in a record/reproduction separate type magnetic recording and reproducing head including the above-described light induction type thin film magnetic recording head, a magnetic sensor that has the stacked configuration of a soft magnetic free layer/a non-magnetic interlayer/a ferromagnetic fixed layer, has a spin valve film or a tunnel junction film where magnetization to a magnetic field which the above-described ferromagnetic fixed layer should sense is fixed, and generates a magnetoresistance effect by a relative angle with the magnetization of the above-described ferromagnetic fixed layer changing by the magnetization of the above-described soft magnetic free layer rotating according to an external magnetic field, and magnetic shields arranged above and below the above-described magnetic sensor, the magnetic shield formed on the upper part of the above-described magnetic sensor serves as a lower magnetic pole of the above-described light induction type thin film magnetic recording head. Owing to these, it becomes possible to perform installation with making locations of an optical irradiation part in the upper magnetic pole, which performs recording operation, and the magnetic sensor extremely approach. In addition, since it is possible to use a part whose cross sectional geometry is a rectangle as the optical waveguide part, it is possible to make the geometry of a record bit rectangular. Furthermore, since the magnetic head can be miniaturized to at least the same extent as a thin film magnetic head put in practical use up to now, it becomes possible to increase recording speed similar to that of a conventional magnetic head.

Moreover, in the above-described light induction type thin film magnetic recording head, a transparent optical waveguide having the geometry of width and thickness gradually becoming large toward a rear end part from a front end part of the upper magnetic core is provided between the upper magnetic core and magnetic gap film to make optical power, combined with the optical waveguide, efficiently radiated on a face of a medium.

Alternatively, the above-described optical waveguide is formed in the upper part of the upper magnetic core, furthermore, an optically transparent optical waveguide having the geometry of width and thickness becoming gradually large toward a rear end part from a front end part of the upper magnetic core is provided on the upper part of the upper magnetic core, a coil generating magnetic flux in a magnetic circuit including the upper magnetic core, a lower magnetic core, a magnetic gap, and a back contact part is arranged around the above-described back contact part, moreover, a magnetic shield formed on the upper part of the magnetic sensor used for reproduction serving as a lower magnetic pole of the above-described light induction type thin film magnetic recording head makes it possible to perform installation with making the optical irradiation part, buried in the upper magnetic pole which performs recording operation, and a magnetic sensor extremely approach, and it is possible not only to increase recording speed similar to that of a conventional magnetic head by making the geometry of a record bit rectangular, but also to make optical power, combined with the optical waveguide, efficiently radiated on a face of a medium.

Alternatively, the above-described optical waveguide is formed inside the insulating layer, furthermore, an optically transparent optical waveguide having the geometry of width and thickness becoming gradually large toward a rear end part from a front end part of the upper magnetic core is provided inside the insulating layer, a coil generating magnetic flux in a magnetic circuit including the upper magnetic core, a lower magnetic core, a magnetic gap, and a back contact part is arranged around the above-described back contact part, furthermore, a magnetic shield formed on the upper part of the magnetic sensor used for reproduction serving as a lower magnetic pole of the above-described light induction type thin film magnetic recording head makes it possible to perform installation with making the optical irradiation part, buried in the upper magnetic pole which performs recording operation, and a magnetic sensor extremely approach, and it is possible not only to increase recording speed similar to that of a conventional magnetic head by making the geometry of a record bit rectangular, but also to make optical power, combined with the optical waveguide, efficiently radiated on a face of a medium.

Furthermore, in the above-described light induction type thin film magnetic recording head, by forming an optically transparent optical waveguide, having the geometry whose width and thickness become gradually large toward a rear end part from a front end part of an upper magnetic core, between the upper magnetic core and a magnetic gap film with a photosensitive resin or a mixture including a photosensitive resin, and furthermore, in the above-described light induction type thin film magnetic recording head, by an optically transparent optical waveguide, having the geometry whose width and thickness become gradually large toward a rear end part from a front end part of an upper magnetic core, forming between the upper magnetic core and a magnetic gap film with a resin, which is soluble in a chemical developer for photoresist, or a mixture including the resin, the above-described tapered structure can be easily formed by using a conventional photolithography process.

Moreover, in the above-described magnetic record and reproduction head formed by using the above-described optical waveguide material, by making the resin curing temperature of the above-described optical waveguide material be temperature lower than the temperature at which the magnetization fixation of a ferromagnetic magnetization fixed layer included in a spin valve magnetic sensor of the magnetic recording and reproducing head is coerced, it is made not to disturb the direction of magnetization of the spin valve magnetic sensor even if the above-described light induction type thin film magnetic recording head is formed after the production of the spin valve magnetic sensor.

In addition, if the above-described magnetic recording and reproducing head and the magnetic recording medium that keeps information by a reversed magnetic domain formed on a surface are used, it is possible to constitute a magnetic recording and reproducing apparatus that can perform super-high density and high-speed record and reproduction.

Thus, according to the present invention, it becomes possible to perform installation with making locations of an optical irradiation part inside an upper magnetic pole which performs recording operation, and a magnetic sensor extremely approach, and, since it is possible to use what has cross-sectional geometry that is a rectangle as an optical waveguide part, it is possible to make the geometry of a record bit a rectangle. In addition, since the magnetic head can be miniaturized to at least the same extent as a thin film magnetic head put in practical use up to now, it becomes possible to increase recording speed similar to that of a conventional magnetic head.

BRIEF DESCRIPTION OF THE DRAWINGS

FIG. 1 is a drawing showing a light induction type thin film magnetic head according to a first embodiment of the present invention, FIG. 1A is a sectional view, FIG. 1B is a schematic diagram in view of an upper part, and FIG. 1C is a drawing in view of a sliding surface, FIG. 3 is a drawing showing an light induction type thin film magnetic head according to a second embodiment of the present invention, FIG. 6 is a drawing showing an light induction type thin film magnetic head according to a third embodiment of the present invention, FIG. 9 is a drawing showing an example in which a semiconductor laser that is a light source is mounted on a slider in which any one of recording and reproducing heads according to three embodiments of the present invention is mounted.

BEST MODE FOR CARRYING OUT THE INVENTION

Figure 2:
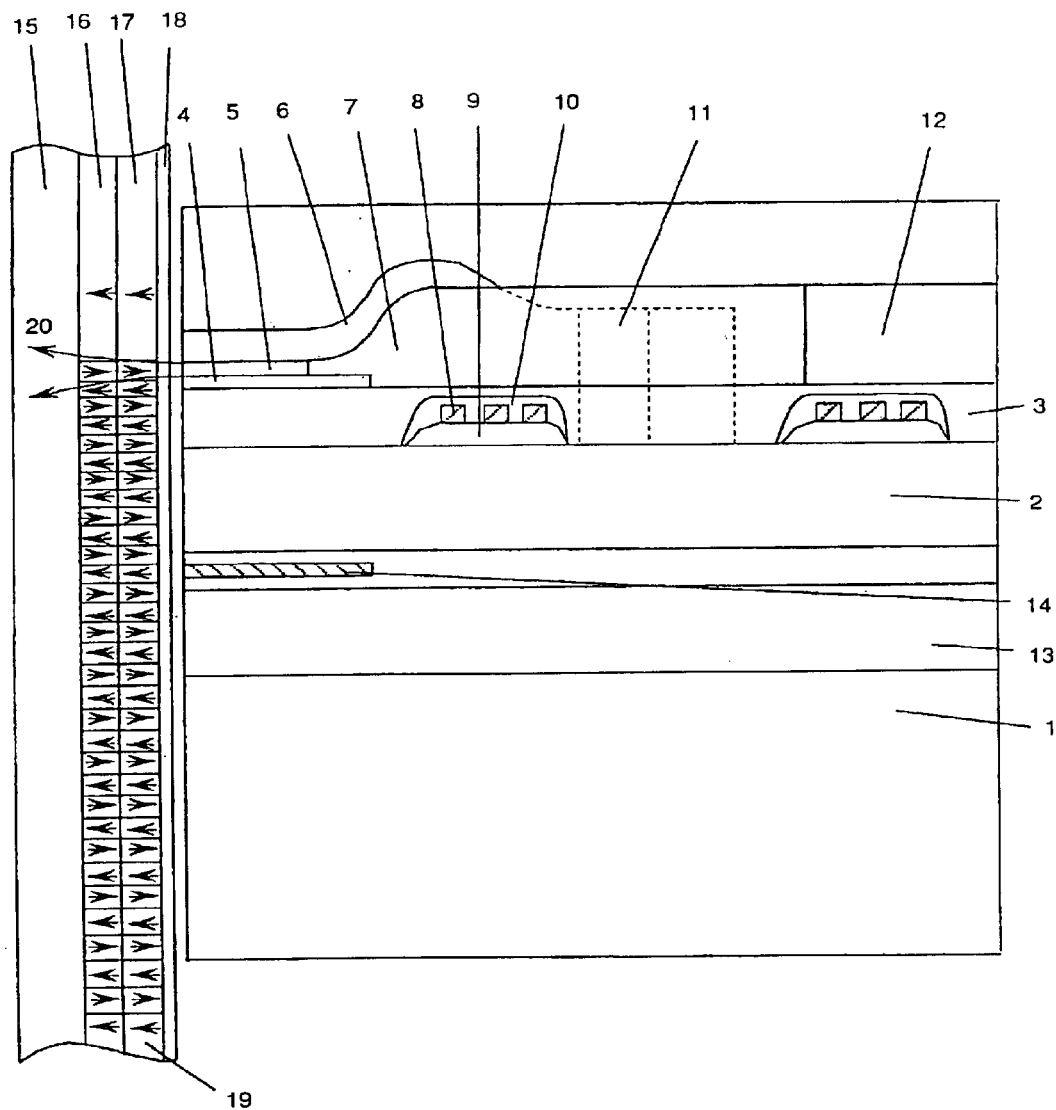
FIG. 2 is a drawing showing a magnetic recording and reproducing head where the light induction type thin film magnetic head, shown in FIG. 1, and a spin valve type magnetic sensor for signal regeneration are integrated, and an embodiment using it for the record and reproduction of a recording medium.

Symbols used for explanation of the invention are as follows. Reference numeral 1 denotes a substrate, 2 denotes a lower magnetic core, 3 denotes a magnetic gap insulating layer, 4 denotes an upper magnetic core base film, 5 denotes an optical waveguide part, 6 denotes an upper magnetic core, 7 denotes a tapered optical waveguide, 8 denotes a coil, 9 denotes a coil base part, 10 denotes a coil insulating film, 11 denotes a back contact part, 12 denotes an optical waveguide, 13 denotes a lower shield, 14 denotes a spin valve type magnetic sensor, 15 denotes a medium substrate, 16 denotes a recording layer, 17 denotes a reproducing layer, 18 denotes a protective coat, 19 denotes recording information, 20 denotes nearfield light, 21 denotes an insulating film, 22 denotes a light induction type thin film magnetic head, 23 denotes a slider, 24 denotes a plane emission laser, 25 denotes an end emission type semiconductor laser, 26 denotes a Si substrate, 27 denotes a ramp part, 28 denotes a record disk, 29 denotes a base, 30 denotes a shaft, 31 denotes a suspension, 32 denotes an arm, 33 denotes a movable mechanism, 34 denotes a shaft, 35 denotes an interface, and 36 denotes a connector.

An embodiment of a light induction type thin film magnetic head according to the present invention is shown in FIG. 1. FIG. 1A is a sectional view of the light induction type thin film magnetic head according to the present invention, FIG. 1B is a schematic diagram of the light induction type thin film magnetic head according to the present invention in view of an upper part, and FIG. 1C is a drawing of the light induction type thin film magnetic head according to the present invention in view of a sliding surface.

The insulating film 3 for providing a magnetic gap with the lower magnetic core 2 is formed on the substrate 1, and the upper magnetic core comprises the base film 4, optical waveguide part 5, and magnetic core body 6. The optical waveguide part 5 is surrounded by the magnetic core body 6 in the circumference as shown in FIG. 1C, and the magnetic core body 6 is connected to the base film 4 around the optical waveguide part 5. In addition, the geometry of a sliding surface of the optical waveguide part 5 is made to be a rectangle. The lower magnetic core 2 and upper magnetic core body 6 are connected via the back contact part 11 in the rear end part. Inside the magnetic gap insulating film 3, the coil 8 that is arranged around the back contact, the coil base 9 and coil insulating film 10 are embedded. An angular U-shaped(or U-shaped) magnetic path is formed by the magnetic core 6, back contact 11, and magnetic core 2, and a magnetic circuit is constituted by a gap in addition to them. Although a part of the magnetic core 6, and the back contact 11 are arranged behind the tapered optical waveguide 11 in FIG. 1A, it can be seen that it has an angular U-shape. The coil 8 circulates around the magnetic circuit in a plane perpendicular to a surface of the recording medium. In this embodiment, the coil 8 is arranged so that it may circulate around the back contact 11. The optical waveguide part 5 is optically connected to the optically transparent tapered optical waveguide 7 that has the geometry whose width and thickness become gradually large toward a rear end part from an front end part of an upper magnetic core, and furthermore, the above-described optical waveguide 7 is optically connected to the optical waveguide 12 which has the almost same geometry, width, and thickness as those of the rear end part of the above-described optical waveguide 7. The geometry of the upper magnetic core 6, as shown in FIG. 1B, is installed so that it may shift from the tapered optical waveguide 7 as it goes to the rear end part, and the back contact part 11 is formed with avoiding the above-described optical waveguide 7.

FIG. 2 is a drawing showing a magnetic recording and reproducing head where the light induction type thin film magnetic head, shown in FIG. 1, and a spin valve type magnetic sensor for signal regeneration are integrated, and an embodiment using it for the record and reproduction of a recording medium. The magnetic shield 13 and spin valve type magnetic sensor 14 for reproducing a signal are formed on the substrate 1. On the spin valve type magnetic sensor 14, the lower magnetic core 2 which served as the magnetic shield is formed, and the light induction type thin film magnetic head shown in FIG. 1 is formed on it. 15 to 18 in FIG. 2 show a recording medium. On the substrate 15, the TbFeCo recording layer 16 that is an amorphous perpendicular magnetization film is formed. Although TbFeCo has large coercive force near a room temperature, holding force rapidly declines if heated at the temperature of 200° C. or more. Then, when the nearfield light 20 is radiated from the optical waveguide 5 to heat the medium and a perpendicular magnetic field is applied from the upper magnetic cores 4 and 6, it is possible to form the vertical recording bit 19 by a comparatively small magnetic field applied. However, generally, since the TbFeCo recording layer has small saturation magnetization in near a room temperature, it is not possible to generate magnetic leakage flux that is sufficient for being detected by the spin valve type reproduction magnetic sensor 14. Then, on the TbFeCo recording layer, for example, the reproduction layer 17 that has large saturation magnetization at the room temperature, consists of TbFeDyCo, and has Curie temperature lower than the recording layer. The temperature of the recording medium is heated more than the Curie temperature of the reproduction layer at the time of information recording, and at this time, information is first recorded on the recording layer. If the temperature of the recording medium falls from the Curie temperature of the reproduction layer, the magnetization of the recording layer is transferred to the reproduction layer. At the room temperature, the saturation magnetization of the reproduction layer increases as described above, the magnetic leakage flux which is sufficient for being detected by the spin valve type reproduction magnetic sensor 14 is generated. On the reproduction layer, the protective coat 18 which served as the heat cooling of the medium and the abrasion prevention of the medium is formed.

Figure 3A:
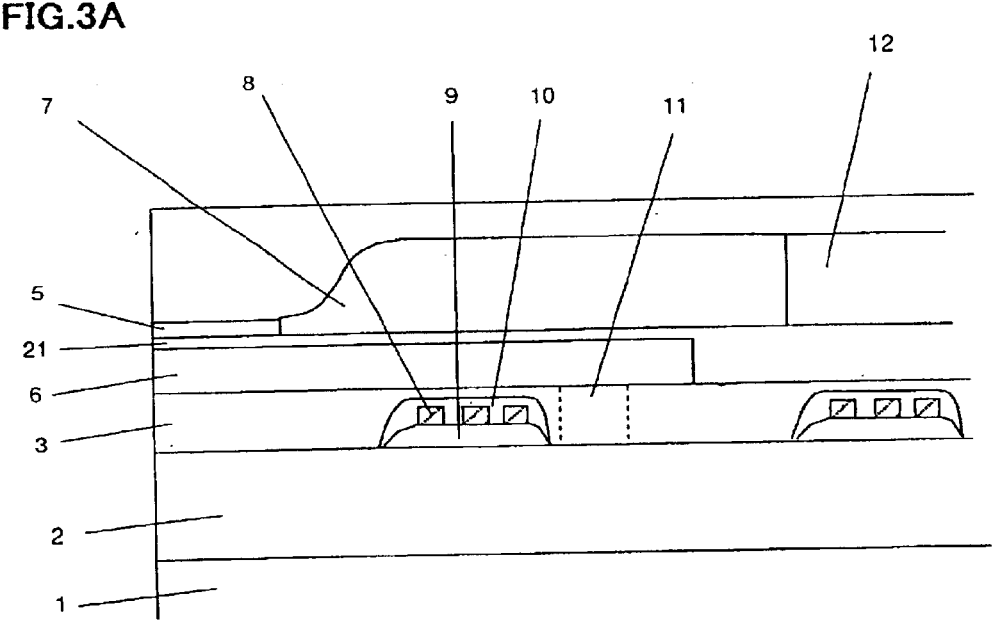
FIG. 3A is a sectional view.
Figure 3B:
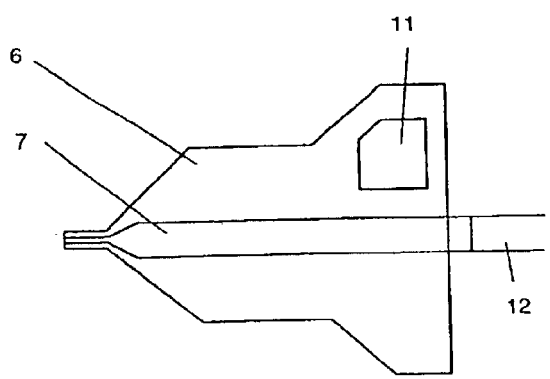
FIG. 3B is a schematic diagram in view of an upper part.
Figure 3C:
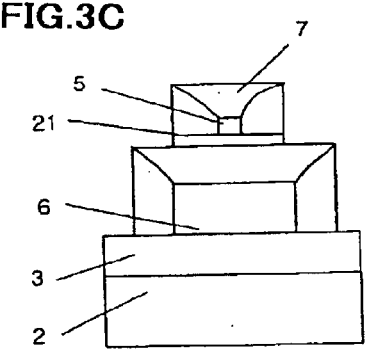
FIG. 3C is a drawing in view of a sliding surface.

A second embodiment of a light induction type thin film magnetic head according to the present invention is shown in FIG. 3. FIG. 3A is a sectional view of the light induction type thin film magnetic head according to the second embodiment, FIG. 3B is a schematic diagram of the light induction type thin film magnetic head according to the second embodiment in view of an upper part, and FIG. 3C is a drawing of the light induction type thin film magnetic head according to the second embodiment in view of a sliding surface. The insulating film 3 for providing a magnetic gap with the lower magnetic core 2 is formed on the substrate 1, the upper magnetic core 6 is formed on the insulating layer 3, and the magnetic core is embedded in the insulating film 21 made of aluminum oxide. The lower magnetic core 2 and upper magnetic core body 6 are connected via the back contact part 11 in the back end part. Inside the magnetic gap insulating film 3, the coil 8 which is arranged around the lower magnetic core and upper magnetic core, the coil base 9, and coil insulation film 10 are embedded. The upper magnetic core 6, and lower magnetic core 7 are connected by the back contact 11, and are formed in the almost angular U-shape(or U-shape). In addition, this angular U-shaped character forms with a gap a magnetic circuit. The coil 8 is arranged so that it may surround the magnetic circuit in a plane perpendicular to a surface of the recording medium. In this embodiment, similarly to the first embodiment, the coil 8 is arranged so that it may circulate around the back contact 11. The optical waveguide part 5 is formed on the insulating film 3. The optical waveguide part 5 is optically connected to the optically transparent tapered optical waveguide 7 that has the geometry whose width and thickness become gradually large toward a rear end part from an front end part of an upper magnetic core, and furthermore, the above-described optical waveguide 7 is optically connected to the optical waveguide 12 which has the almost same geometry, width, and thickness as those of the rear end part of the above-described optical waveguide 7. In addition, the geometry of a sliding surface of the optical waveguide part 5 is made to be a rectangle. The back contact part 11 is formed with avoiding the above-described optical waveguide 7, as shown in FIG. 3B.

Figure 4:
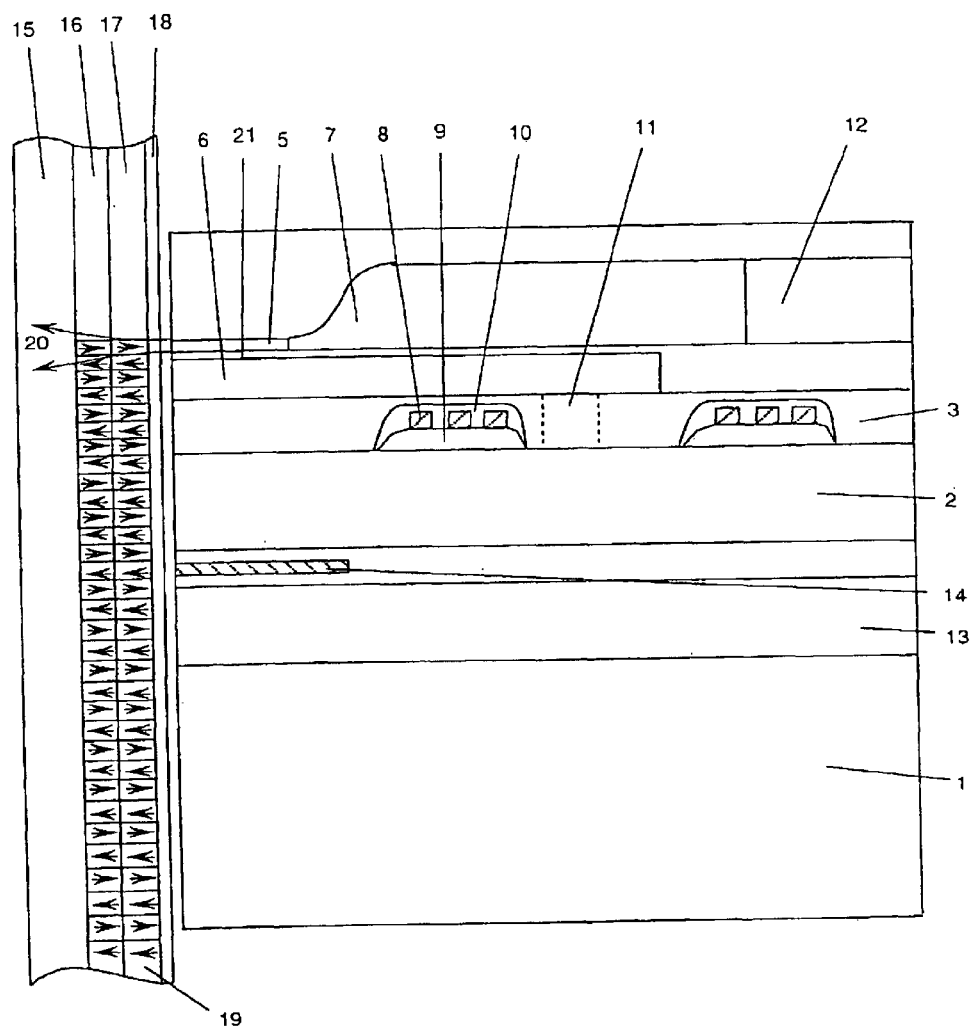
FIG. 4 is a drawing showing a magnetic recording and reproducing head where the light induction type thin film magnetic head, shown in FIG. 3, and a spin valve type magnetic sensor for signal reproduction are integrated, and an embodiment using it for the record and reproduction of a recording medium.
Figure 5A:
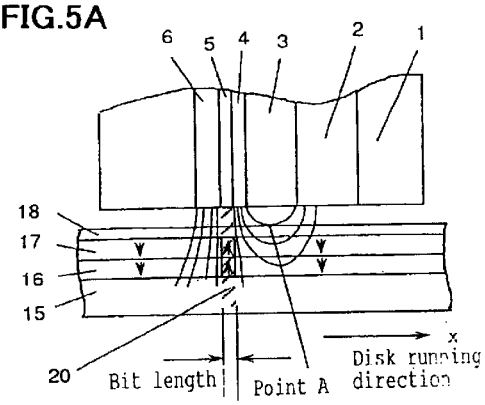
FIG. 5 is a diagram for explaining signal recording process in the above-described first and second embodiments.
Figure 5B:
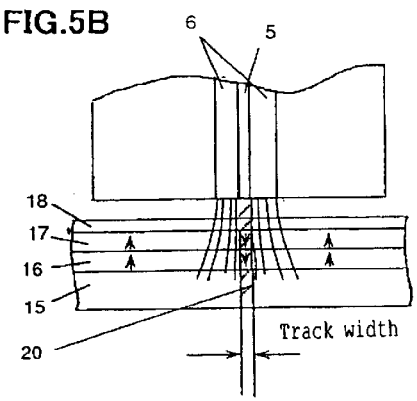
Figure 5C:
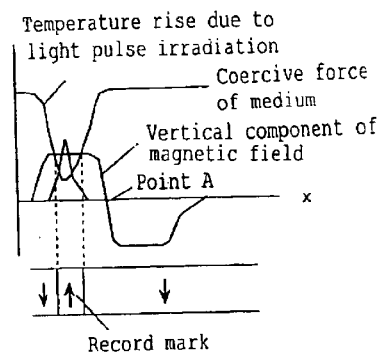
Figure 5D:
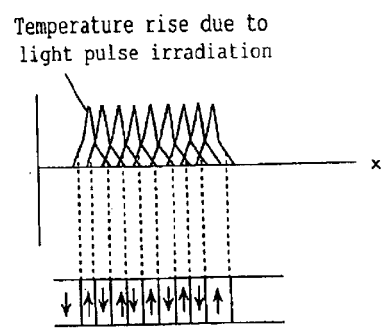

FIG. 4 is a drawing showing a magnetic recording and reproducing head where the light induction type thin film magnetic head, shown in FIG. 3, and a spin valve type magnetic sensor for signal regeneration are integrated, and an embodiment using it for the record and reproduction of a recording medium. The magnetic shield 13 and spin valve type magnetic sensor 14 for reproducing a signal are formed on the substrate 1. On the spin valve type magnetic sensor 14, the lower magnetic core 2 which served as the magnetic shield is formed, and the light induction type thin film magnetic head shown in FIG. 3 is formed thereon. 15 to 18 in FIG. 4 are the same recording medium as that in FIG. 2. A reproducing method of the information 19 on a recording medium is the almost same as that in FIG. 2. However, since the optical waveguide part 5 is formed on the upper part of the upper magnetic core 6, a recording magnetic field a little larger than the recording magnetic field in the case of FIG. 2 is required.

FIG. 5 is a diagram for explaining signal-recording process in the first and second embodiments. FIG. 5A is a sectional view in a plane parallel to a recording truck, and FIG. 5B is a sectional view in a plane perpendicular to a recording truck. The nearfield light 20 is radiated on the recording medium through the optical waveguide part 5 that penetrates the inside of the upper magnetic cores 4 and 6. The nearfield light is radiated in a pulsed state, and its size is set to be sufficiently smaller than the space distribution size of a modulation magnetic field applied by the upper magnetic cores 4 and 6 as shown in FIG. 5C so that the applied magnetic field can be regarded as a fixed auxiliary magnetic field in a light pulse irradiation portion. Owing to this, it becomes possible to reverse medium magnetization in a portion where the coercive force of the medium is fallen by light pulse irradiation, and it becomes possible to chiefly control record bit size in sufficient precision with light pulse size. When the direction of magnetic field application is reversed by turns while making a light pulse continuously radiated as shown in FIG. 5D with running a medium in the direction of the x-axis, magnetization is reversed by turns as shown in FIG. 5D, and a minute record mark whose bit length is one-fifth or less of the light pulse size can be recorded.

Although the above recording method itself is a well-known method as light pulse magnetic field modulation recording, there are the following advantages by using a light induction type thin film magnetic head according to the present invention. First, since the optical circular spot condensed by a lens as an irradiation light was used in the conventional light pulse magnetic field modulation recording, the geometry of a bit recorded was crescent. However, since a magnetic sensor used for reproduction of the crescent record mark recorded on the recording medium was rectangular, there was a problem that resolution greatly fell at the time of reproduction. However, since the optical waveguide part 5 having a rectangular cross section is used in the light induction type thin film magnetic head according to the present invention, the geometry of the radiated nearfield light is also a rectangle, and hence, there is no deterioration of the resolution at the time of reproduction. In addition, the conventional magnetic head had large size and its magnetic field modulation rate was slow, which became obstacles of high-speed recording. Nevertheless, since it is possible to use a magnetic head having size equivalent to a thin film magnetic head used for a conventional magnetic recording apparatus as a magnetic head which applies an auxiliary magnetic field in the light induction type thin film magnetic head according to the present invention, high-speed recording operation at several hundreds MHz can be attained. If a rectangular optical waveguide part with the width of 0.2 μm and the thickness of 0.2 μm is used as the optical waveguide part 5, high-density recording of about 80 Gigabits per 2.54 square centimeters where bit size is 40 nm or less and bit width is 0.2 μm can be attained. Furthermore, in the present invention, since it becomes possible to make an upper shield of a magnetic sensor for reproduction serve as a lower magnetic pole of the above-described light induction type thin film magnetic recording head, it is possible to arrange a recording head and a reproducing head with making them approach at least just like a conventional magnetic recording and reproducing head, and hence, it is possible to solve the trouble that the recording head and reproducing head access different information tracks like the above-described first conventional example.

In addition, in the present invention, since an optical irradiation area and an area of magnetic field application completely lap or extremely approach, there arises no such problem that temperature distribution spreads in an area of magnetic field application like the above-described second conventional example.

Figure 6A:
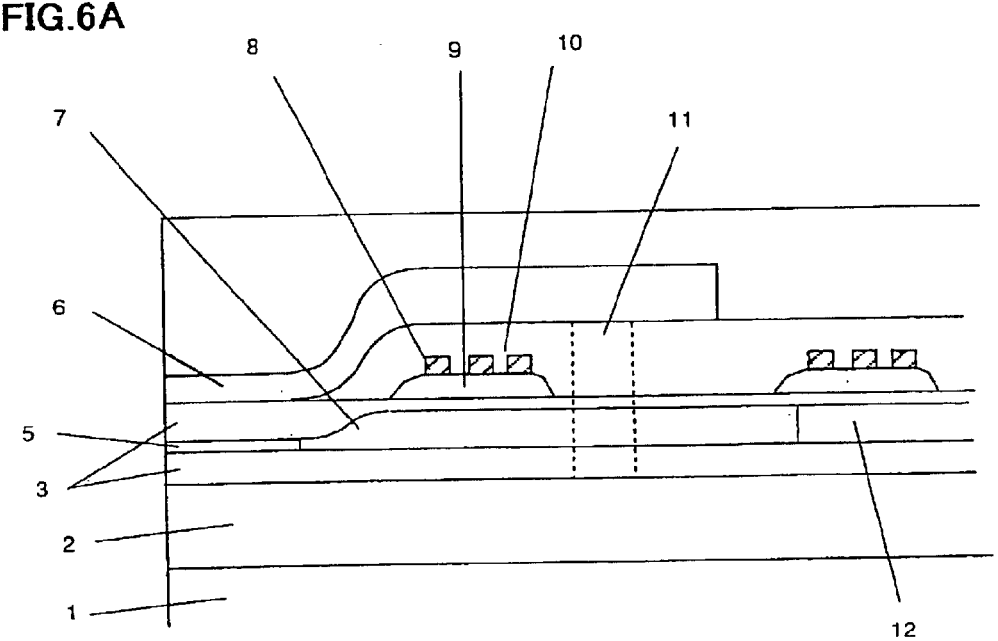
FIG. 6A is a sectional view.
Figure 6B:
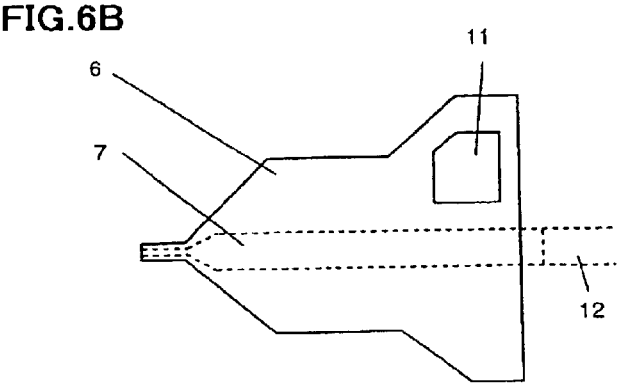
FIG. 6B is a schematic diagram in view of an upper part.
Figure 6C:
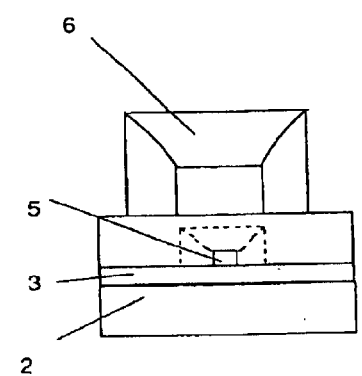
FIG. 6C is a drawing in view of a sliding surface.

A third embodiment of a light induction type thin film magnetic head according to the present invention is shown in FIG. 6. FIG. 6A is a sectional view of the light induction type thin film magnetic head according to the third embodiment, FIG. 6B is a schematic diagram of the light induction type thin film magnetic head according to the third embodiment in view of an upper part, and FIG. 6C is a drawing of the light induction type thin film magnetic head according to the third embodiment in view of a sliding surface. The insulating film 3 for providing a magnetic gap with the lower magnetic core 2 is formed on the substrate 1. Near the magnetic cores, the optical waveguide part 5, the tapered optical waveguide 7 optically connected to the optical waveguide part 5 which has the geometry whose width and thickness become gradually large toward a rear end part from a front end part of the upper magnetic core 2, and furthermore, the optical waveguide 12 which has the uniform width and thickness the almost same as the rear end part of the above-described optical waveguide 7 are formed inside the insulating layer 3. The geometry of a sliding surface of the optical waveguide part 5 is made to be a rectangle. The upper magnetic core 6 is formed on the insulating layer 3, and the lower magnetic core 2 and the upper magnetic core 6 are connected via the back contact part 11 in the rear end part. Between the above-described insulating layer and upper magnetic core, the coil 8 that is arranged around the back contact part 11, the coil base 9, and coil insulation film 10 are embedded. The back contact 11 is arranged in a central part of the circulating coil 8, as shown in the sectional view, the magnetic core 6 and magnetic core 2 are connected via the back contact 11, and these mostly form an angular U-shape (or a U-shape). The back contact part 11 is formed with avoiding the above-described optical waveguide 7, as shown in FIG. 6B.

Figure 7:
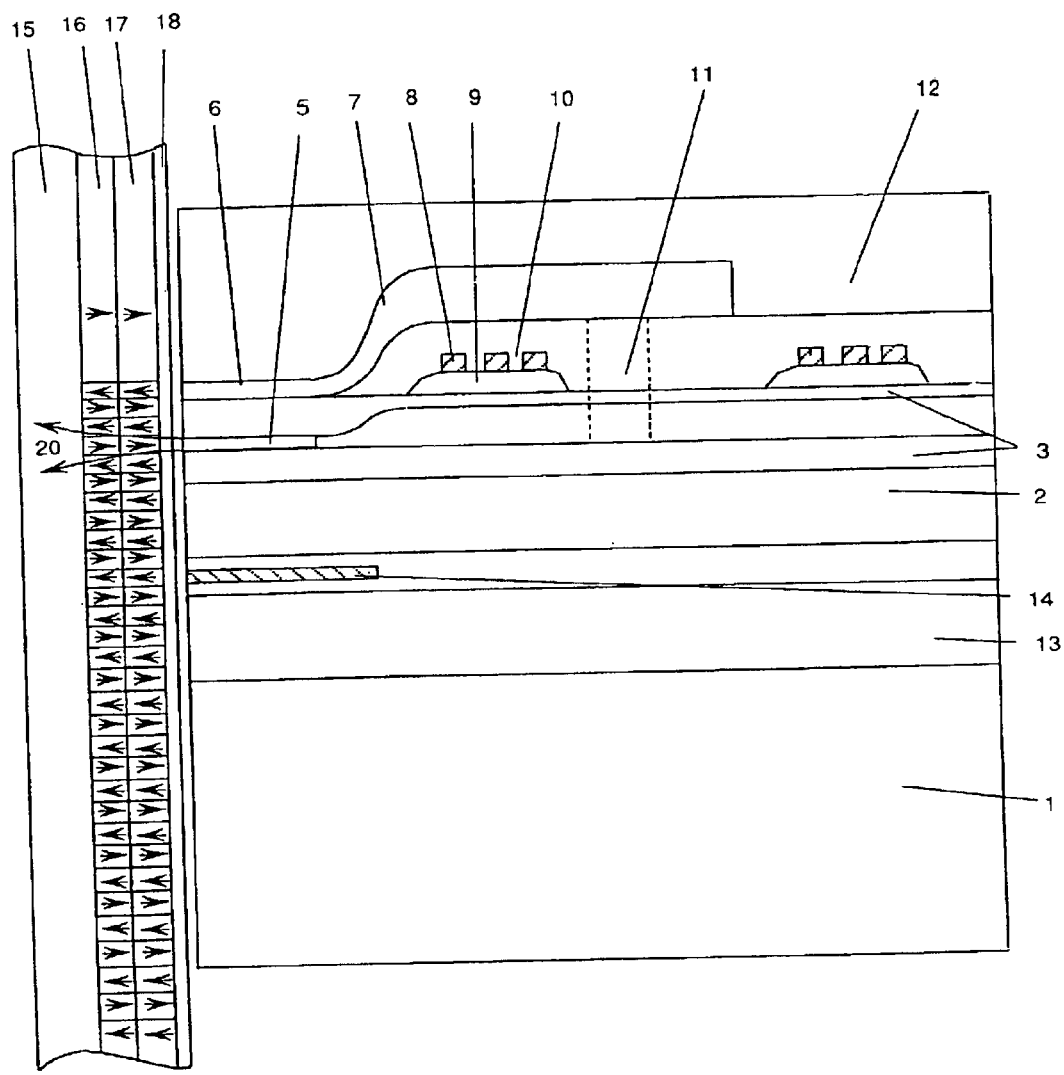
FIG. 7 is a drawing showing a magnetic recording and reproducing head where the light induction type thin film magnetic head, shown in FIG. 6, and a spin valve type magnetic sensor for signal regeneration are integrated, and an embodiment using it for the record and reproduction of a recording medium.

FIG. 7 is a drawing showing a magnetic recording and reproducing head where the light induction type thin film magnetic head, shown in FIG. 6, and a spin valve type magnetic sensor for signal regeneration are integrated, and an embodiment using it for the record and reproduction of a recording medium. The magnetic shield 13 and spin valve type magnetic sensor 14 for reproducing a signal are formed on the substrate 1. On the spin valve type magnetic sensor 14, the lower magnetic core 2 which served as the magnetic shield is formed, and the light induction type thin film magnetic head shown in FIG. 6 is formed on it. Character 15 to 18 in FIG. 4 are the same recording medium as that in FIG. 2.

Figure 8A:
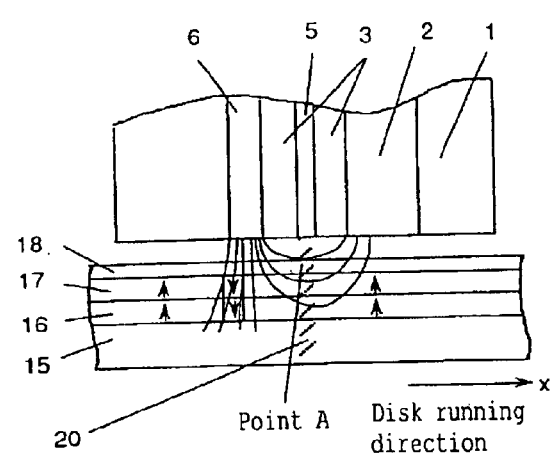
FIG. 8 is a diagram for explaining signal recording process in the above-described third embodiment.
Figure 8B:
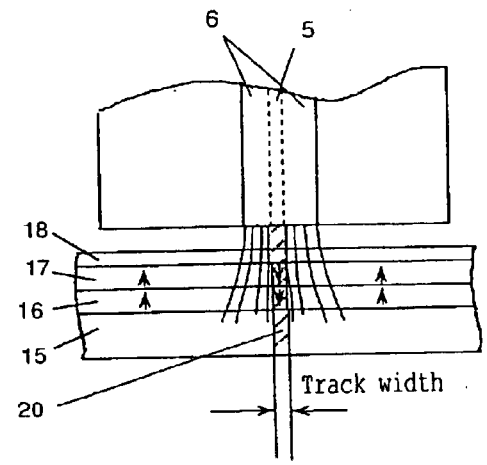
Figure 8C:
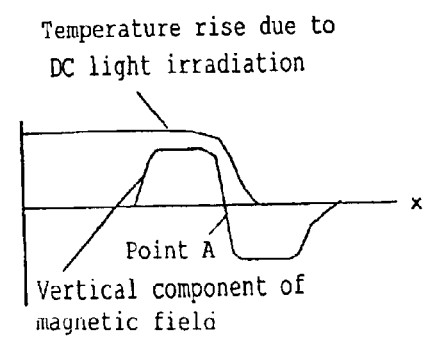

FIG. 8 is a diagram for explaining signal-recording process in the third embodiment. FIG. 8A is a sectional view in a plane parallel to a recording truck, and FIG. 8B is a sectional view in a plane perpendicular to a recording truck. The nearfield light 20 is radiated on the recording medium through the optical waveguide part 5 that penetrates the inside of the insulating layer 3 for a magnetic gap. The nearfield light is radiated as continuation light, and its width is set to be sufficiently smaller than that of the upper magnetic core 6 as shown in FIG. 8B. The medium temperature of a portion in recording track width in FIG. 8B rises by light irradiation, medium magnetization is reversed by the auxiliary modulation magnetic field applied by the upper magnetic core 6, and information recording is performed. In a recording method according to this embodiment, although the width of a record bit is controlled by the width of irradiation light, bit length is determined by the inclination in the direction of the x-axis of the magnetic field applied from an upper magnetic core like a conventional magnetic recording apparatus.

Hereafter, a production method of a light induction type thin film magnetic recording head according to the present invention will be described by using the first embodiment as an example. First, a magnetic film such as Permalloy is grown on the substrate 1 with a method such as plating. Next, the coil base part 9 is formed, for example, a frame having the geometry of the coil 8 is formed thereon by photolithography, the coil 8 is formed by a method such as plating, and the coil insulating film 10 is formed after stripping a resist to cover the coil 8. Next, after forming the insulating layer 3 by a method such as sputtering and performing planarization, the back contact part 11 is bored by a method such as photolithography and reactive ion etching. Next, magnetic material is grown up into the bored back contact part by plating etc., and planarization is again performed in the upper part of the insulating layer. Next, the lower part 4 of the upper magnetic pole is formed by a method such as sputtering, and patterning is performed by photolithography, etching, etc. Furthermore, in order to produce the optical waveguide part 5, an optically transparent film such as $SiO_2$ is formed by a method such as a 0.2-μm sputtering, a photoresist for a KrF excimer laser is applied on $SiO_2$, and a 0.2-μm pattern is formed by a KrF excimer laser stepper, furthermore, in order to produce the optical waveguide part 5, an optically transparent film such as $SiO_2$ is formed by a method such as a 0.2-μm sputtering, a photoresist for the KrF excimer laser is applied on $SiO_2$, and a 0.2-μm pattern is formed by the KrF excimer laser stepper, $SiO_2$ is etched by a method such as reactive ion etching which uses a mixed gas of $CHF_3$ and $O_2$ by using the resist pattern as a mask, the resist is stripped, and the approximately rectangular optical waveguide part made of $SiO_2$ with the width of 0.2 μm and the height of 0.2 μm is obtained. Next, a portion that surrounds the optical waveguide part 5 among the upper magnetic pole 6 is formed by using a method such as photolithography and plating again.

Next, resin material such as polydimethylglutarimide whose resin softening temperature is lower than the temperature at which the magnetization fixation of a ferromagnetic magnetization fixed layer included in the spin valve magnetic reproducing sensor of the magnetic reproducing head is maintained, that is, typically, temperature lower than 250° C. is spin-coated, and is baked in 5 minutes at 180° to be cured. Next, after forming a resist pattern on the resin layer, patterning is performed by oxygen plasma etching, the resist is removed, and the optical waveguide by a convex type resin is formed. Then, the resin is baked at about 230° C., the resin is softened, and the optical waveguide 11 with tapered geometry is obtained. In the above-described example, although heat treatment temperature is described with assuming polydimethylglutarimide as material, it is not restricted to this when using other material. The reason why the material whose resin softening temperature is lower than the temperature at which the magnetization fixation of a ferromagnetic magnetization fixed layer included in the spin valve magnetic reproducing sensor of the magnetic reproducing head is maintained is that, usually, when producing a magnetic reproducing head where a reproducing head and a recording head are separated, as shown in FIG. 2, a step of producing the recording head after producing the reproducing head first is adopted.

If it is a photosensitive resin or a mixture including a photosensitive resin and is the material, which is soluble in a photoresist chemical developer, like the above-described polydimethylglutarimide, it is possible to use a production method still simpler than the above. Thus, it is possible to form the optical waveguide with the convex type resin by performing exposure by the KrF excimer laser stepper by directly using the photomask with the geometry of the optical waveguide after spin-coating the above-described resin, and performing developement.

Usually, although it is very difficult to produce the optical waveguide with tapered geometry, it is possible to simply produce the tapered optical waveguide in low cost by using the softening deformation of a resin as described above.

In the above example, although the production method of the light induction type thin film magnetic recording head according to the present invention is described with supposing the first embodiment, also when the heads in FIG. 4 and FIG. 6 are produced, it is possible to produce the light induction type thin film magnetic head with the almost same production method although their process order changes.

Figure 9A:
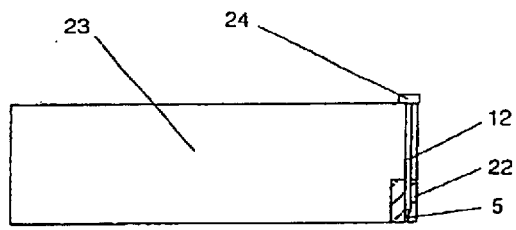
FIG. 9A is a drawing showing a plane emission laser.
Figure 9B:
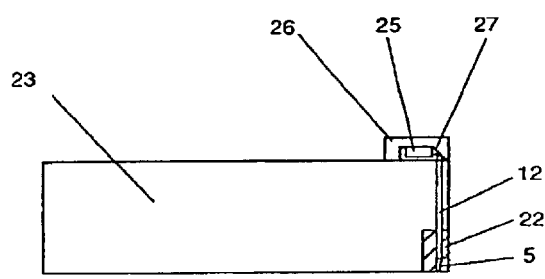
FIG. 9B is a drawing showing an example in which an end emission type semiconductor laser is mounted.

FIG. 9 is examples that lasers that supply light to optical waveguides are mounted directly on the floating slider 23 on which the light induction type thin film magnetic head 22 in FIG. 2, FIG. 4, or FIG. 7 are mounted. FIG. 9(a) is an example that a plane emission laser 24 is directly bonded with the optical waveguide 12, which penetrates the slider 23, as a laser. Since the plane emission laser 24 has a threshold current value for laser oscillation that is very as small, that is, several mA, power consumption is small and high-speed intensity modulation is possible, and hence, it is suitable for mounting on the small slider 23 used in the present invention. FIG. 9B shows an example that the end emission type semiconductor laser 25 generally used now is mounted on a surface opposite to a sliding surface of the slider 23 and is bonded with the optical waveguide 12, which penetrates the slider 23, and a micro mirror. The semiconductor laser is attached to a concavity having a 45° inclination 27 made by anisotropic etching of the Si substrate 26, and is bonded on the slider 23 as the whole Si substrate 26 after adjusting a laser location so that an optical coupling efficiency may become the maximum.

Figure 10:
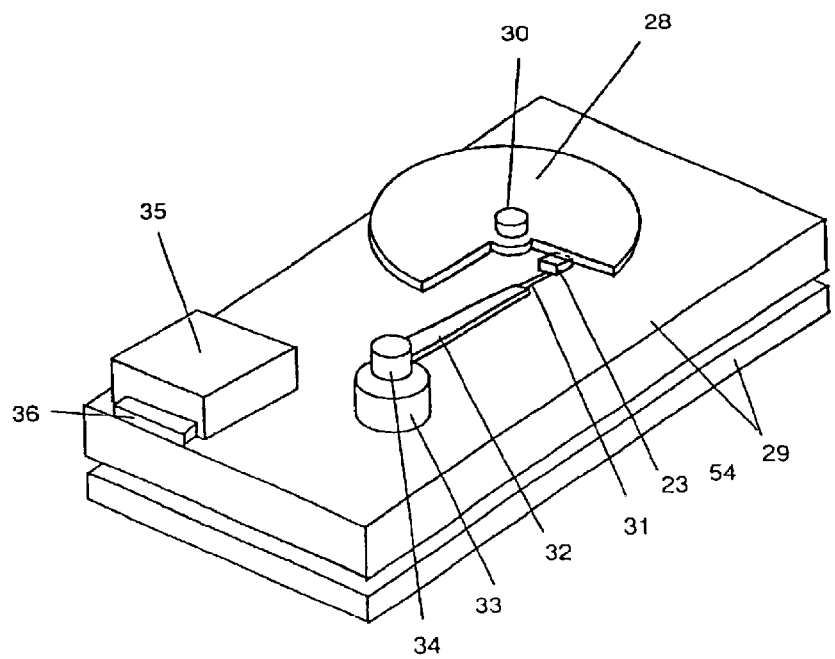
FIG. 10 is a drawing showing a magnetic recording and reproducing apparatus in which any one of recording and reproducing heads according to three embodiments of the present invention is mounted.

FIG. 10 is a drawing showing a magnetic recording and reproducing apparatus where the slider 23 on which the magnetic recording and reproducing head shown in FIG. 2, FIG. 4, or FIG. 7 is mounted, and a recording disk 28 (around recording medium) are mounted thereon. The record disk 28 is attached to a shaft 30 connected to a spindle motor (not shown in FIG. 10) fixed to a base 29. The recording disk 28 is rotated by the rotation of a spindle, and performs relative motion to the slider 23. The slider 23 is fixed to a suspension 31, and further, the suspension 31 is attached to an arm 32. The arm 32 performs the access to an information track and tracking operation to a predetermined information track by rotating about the shaft 34 according to a movable mechanism 33 and making the slider 27 move to the radial direction of the recording disk 28. A connector 36 is connected to an interface 35 installed to the base 29, and the supply of power for driving this apparatus, a record and reproduction instruction to the apparatus, an input of recording information, an output of reproduced information, etc. are performed through a cable connected to the connector 36.

Industrial Applicability

According to the implementation of the present invention, it is possible to provide a small light induction type thin film magnetic head, which can record a rectangular magneto-optic recording bit at high speed and in which a recording head and a reproducing head approach, and an light induction type magnetic recording and reproducing apparatus using this head.

What is claimed is:

1. A light induction type thin film magnetic head, comprising:
    a lower magnetic core formed on a substrate;
    an upper magnetic core whose front end part is connected to the lower magnetic core through a magnetic gap and whose rear end part is directly connected to the lower magnetic core with a back contact part formed of a magnetic substance;
    an insulating layer formed between the upper magnetic core and the lower magnetic core;
    an optical waveguide part formed inside the upper magnetic core; and
    a magnetic flux generating part that circulates around the back contact part inside the insulating layer,
    wherein said light induction type thin film magnetic recording head can operate as part of a magnetic recording and reproducing head which comprises:
    a magnetic sensor that has a stacked configuration of a soft magnetic free layer/a non-magnetic interlayer/a ferromagnetic fixed layer, a spin valve film or a tunnel junction film where magnetization to a magnetic field which the ferromagnetic fixed layer should sense is fixed, and which generates magnetoresistance by a relative angle with the magnetization of the ferromagnetic fixed layer changing by the magnetization of the soft magnetic free layer rotating according to an external magnetic field, and
    magnetic shields arranged above and below the magnetic sensor,
    wherein the resin softening temperature of the material of the optical waveguide is lower than the temperature at which magnetization fixation of a ferromagnetic magnetization fixed layer included in the magnetic sensor is coerced.

2. The light induction type thin film magnetic recording head according to claim 1, wherein the upper magnetic core, the lower magnetic core, the magnetic gap, and the back contact part become a magnetic circuit owing to magnetic flux generated in the magnetic flux generating part.

3. The light induction type thin film magnetic recording head according to claim 1, further comprising:

an optical waveguide whose end bonds with the optical waveguide part between the upper magnetic core and the insulating layer and which has a geometry whose width and thickness become gradually large toward a rear end part from a front end part of the upper magnetic core.

4. The light induction type thin film magnetic recording head according to claim 3, wherein the optical waveguide is formed with a photosensitive resin or a mixture including a photosensitive resin.

5. The light induction type thin film magnetic recording head according to claim 3, wherein the optical waveguide is formed with a resin, which is soluble in a chemical developer for photoresist, or a mixture including the resin.

6. A magnetic recording and reproducing head, comprising:

a light induction type thin film magnetic recording head according to claim 1;

said stacked configuration of a soft magnetic free layer/a non-magnetic interlayer/a ferromagnetic fixed layer;

said spin valve film or tunnel junction film where magnetization to a magnetic field that the ferromagnetic fixed layer should sense is fixed;

said magnetic sensor that generates a magnetoresistance effect by a relative angle with magnetization of the ferromagnetic fixed layer changing by magnetization of the soft magnetic free layer rotating according to an external magnetic field; and said magnetic shields arranged above and below the magnetic sensor, characterized in that the magnetic shield formed on the upper part of the magnetic sensor serves as the lower magnetic core of the light induction type thin film magnetic recording head.

7. A magnetic recording and reproducing apparatus, comprising the magnetic recording and reproducing head according to claim 6.

8. A light induction type thin film magnetic recording head, comprising:

a lower magnetic core formed on a substrate;

an upper magnetic core whose front end part is connected to the lower magnetic core through a magnetic gap film and whose rear end part is directly connected to the lower magnetic core with a back contact part formed of a magnetic substance;

an insulating layer formed between the upper magnetic core and the lower magnetic core; and a coil having an optical waveguide part formed therein, said optical waveguide having a width smaller than a width of the upper magnetic core and a thickness thinner than a thickness of the upper magnetic core, said coil generates magnetic flux in a magnetic circuit composed of the upper magnetic core, the lower magnetic core, the magnetic gap, and the back contact part and is arranged around the back contact part, wherein said light induction type thin film magnetic recording head can operate as part of a magnetic recording and reproducing head which comprises:

a magnetic sensor that has a stacked configuration of a soft magnetic free layer/a non-magnetic interlayer/a ferromagnetic fixed layer, a spin valve film or a tunnel junction film where magnetization to a magnetic field which the ferromagnetic fixed layer should sense is fixed, and which generates magnetoresistance by a relative angle with the magnetization of the ferromagnetic fixed layer changing by the magnetization of the soft magnetic free layer rotating according to an external magnetic field, and magnetic shields arranged above and below the magnetic sensor, wherein the resin softening temperature of the material of the optical waveguide is lower than the temperature at which magnetization fixation of a ferromagnetic magnetization fixed layer included in the magnetic sensor is coerced.

9. The light induction type thin film magnetic recording head according to claim 8, further comprising:

an optical waveguide whose end bonds with the optical waveguide part and whose width and thickness become gradually large toward a rear end part from a front end part of the upper magnetic core.

10. The light induction type thin film magnetic recording head according to claim 9, wherein the optical waveguide is formed with a photoresistive resin or a mixture including the photoresistive resin.

11. The light induction type thin film magnetic recording head according to claim 9, wherein the optical waveguide is formed with a resin, which is soluble in a chemical developer for photoresist, or a mixture including the resin.

12. A magnetic recording and reproducing head, comprising:

a light induction type thin film magnetic recording head according to claim 8;

said magnetic sensor that has stacked configuration of a soft magnetic free layer/a non-magnetic interlayer/a ferromagnetic fixed layer, has said spin valve film or tunnel junction film where magnetization to a magnetic field which the ferromagnetic fixed layer should sense is fixed, and produces a magnetoresistance effect by a relative angle with the magnetization of the ferromagnetic fixed layer changing by the magnetization of the soft magnetic free layer rotating according to an external magnetic field; and said magnetic shields arranged above and below the magnetic sensor, wherein the magnetic shield formed on the upper part of the magnetic sensor serves as a lower magnetic core of the light induction type thin film magnetic recording head.

13. A magnetic recording and reproducing apparatus, comprising the magnetic recording and reproducing head according to claim 8.

14. A light induction type thin film magnetic head, comprising:

a lower magnetic core formed on a substrate;

an upper magnetic core whose front end part is connected to the lower magnetic core through a magnetic gap film and whose rear end part is directly connected to the lower magnetic core with a back contact part formed of a magnetic substance; and an insulating layer formed between the upper magnetic core and the lower magnetic core, wherein an optical waveguide part having a width which is smaller than a width of the upper magnetic core and whose thickness is thinner than the thickness of the upper magnetic core is formed in the insulating layer, and a coil which generates magnetic flux in a magnetic circuit composed of the upper magnetic core, the lower magnetic core, the magnetic gap, and the back contact part is arranged around the back contact part, wherein said light induction type thin film magnetic recording head can operate as part of a magnetic recording and reproducing head which comprises:

a magnetic sensor that has a stacked configuration of a soft magnetic free layer/a non-magnetic interlayer/a ferromagnetic fixed layer, a spin valve film or a tunnel junction film where magnetization to a magnetic field which the ferromagnetic fixed layer should sense is fixed, and which generates magnetoresistance by a relative angle with the magnetization of the ferromagnetic fixed layer changing by the magnetization of the soft magnetic free layer rotating according to an external magnetic field, and magnetic shields arranged above and below the magnetic sensor, wherein the resin softening temperature of the material of the optical waveguide is lower than the temperature at which magnetization fixation of a ferromagnetic magnetization fixed layer included in the magnetic sensor is coerced.

15. The light induction type thin film magnetic recording head according to claim 14, further comprising:

an optical waveguide whose end bonds with the optical waveguide part and whose width and thickness become gradually large toward a rear end part from a front end part of the upper magnetic core.

16. The light induction type thin film magnetic recording head according to claim 15, wherein the optical waveguide is formed with a resin, which is soluble in a chemical developer for photoresist, or a mixture including the resin.

17. The light induction type thin film magnetic recording head according to claim 14, wherein the optical waveguide is formed with a photosensitive resin or a mixture including a photosensitive resin.

18. A magnetic recording and reproducing head, comprising:

a light induction type thin film magnetic recording head according to claim 14;

said magnetic sensor that has stacked configuration of a soft magnetic free layer/a non-magnetic interlayer/a ferromagnetic fixed layer, has said spin valve film or tunnel junction film where magnetization to a magnetic field which the ferromagnetic fixed layer should sense is fixed, and generates a magnetoresistance effect by a relative angle with the magnetization of the ferromagnetic fixed layer changing by the magnetization of the soft magnetic free layer rotating according to an external magnetic field; and said magnetic shields arranged above and below the magnetic sensor, characterized in that the magnetic shield formed on the upper part of the magnetic sensor serves as the lower magnetic pole of the light induction type thin film magnetic recording head.

19. A magnetic recording and reproducing apparatus, comprising the magnetic recording and reproducing head according to claim 18.

20. A magnetic recording and reproducing head comprising:

a light induction type thin film magnetic recording head, wherein said light induction type thin film magnetic head, comprises:

a lower magnetic core formed on a substrate, an upper magnetic core whose front end part is connected to the lower magnetic core through a magnetic gap film and whose rear end part is directly connected to the lower magnetic core with a back contact part formed of a magnetic substance, an insulating layer formed between the upper magnetic core and the lower magnetic core, wherein an optical waveguide part having a width which is smaller than a width of the upper magnetic core and whose thickness is thinner than the thickness of the upper magnetic core is formed in the insulating layer, and a coil which generates magnetic flux in a magnetic circuit composed of the upper magnetic core, the lower magnetic core, the magnetic gap, and the back contact part is arranged around the back contact part, and an optical waveguide whose end bonds with the optical waveguide part and whose width and thickness become gradually large toward a rear end part from a front end part of the upper magnetic core, wherein the optical waveguide is formed with a resin, which is soluble in a chemical developer for photoresist, or a mixture including the resin;

a magnetic sensor that has a stacked configuration of a soft magnetic free layer/a non-magnetic interlayer/a ferromagnetic fixed layer, a spin valve film or a tunnel junction film where magnetization to a magnetic field which the ferromagnetic fixed layer should sense is fixed, and which generates magnetoresistance by a relative angle with the magnetization of the ferromagnetic fixed layer changing by the magnetization of the soft magnetic free layer rotating according to an external magnetic field; and magnetic shields arranged above and below the magnetic sensor, wherein the resin softening temperature of the material of the optical waveguide is lower than the temperature at which magnetization fixation of a ferromagnetic magnetization fixed layer included in the magnetic sensor is coerced.

21. A magnetic recording and reproducing apparatus, comprising said magnetic recording and reproducing head according to claim 20.

22. An light induction type thin film magnetic recording head, comprising:

an angular U-shaped magnetic core having a gap opposing a recording medium to be recorded;

a coil generating magnetic flux in the direction perpendicular to a face of the recording medium so that the magnetic core may be surrounded; and an optical waveguide part embedded in the magnetic core following the gap, characterized in that a reversed magnetic domain is formed by radiating light on the recording medium by the optical waveguide part and applying magnetic flux, generated by magnetic flux generating means, by the magnetic cores, wherein said light induction type thin film magnetic recording head can operate as part of a magnetic recording and reproducing head which comprises:

a magnetic sensor that has a stacked configuration of a soft magnetic free layer/a non-magnetic interlayer/a ferromagnetic fixed layer, a spin valve film or a tunnel junction film where magnetization to a magnetic field which the ferromagnetic fixed layer should sense is fixed, and which generates magnetoresistance by a relative angle with the magnetization of the ferromagnetic fixed layer changing by the magnetization of the soft magnetic free layer rotating according to an external magnetic field, and magnetic shields arranged above and below the magnetic sensor, wherein the resin softening temperature of the material of the optical waveguide is lower than the temperature at which magnetization fixation of a ferromagnetic magnetization fixed layer included in the magnetic sensor is coerced.

23. The light induction type thin film magnetic recording head according to claim 22, wherein the optical waveguide part is provided with adjoining to the magnetic core.

24. A light induction type thin film magnetic recording head, comprising:

an angular U-shaped magnetic core having a gap opposing a recording medium to be recorded;

a coil generating magnetic flux in the direction perpendicular to a face of the recording medium so that the magnetic core may be surrounded; and an optical waveguide part embedded in the magnetic core following the gap, wherein a reversed magnetic domain is formed by radiating light on the recording medium by the optical waveguide part and applying magnetic flux, generated by the coil, by the magnetic core, and wherein the optical waveguide is arranged inside the angular U-shaped magnetic core, wherein said light induction type thin film magnetic recording head can operate as part of a magnetic recording and reproducing head which comprises:

a magnetic sensor that has a stacked configuration of a soft magnetic free layer/a non-magnetic interlayer/a ferromagnetic fixed layer, a spin valve film or a tunnel junction film where magnetization to a magnetic field which the ferromagnetic fixed layer should sense is fixed, and which generates magnetoresistance by a relative angle with the magnetization of the ferromagnetic fixed layer changing by the magnetization of the soft magnetic free layer rotating according to an external magnetic field, and magnetic shields arranged above and below the magnetic sensor, wherein the resin softening temperature of the material of the optical waveguide is lower than the temperature at which magnetization fixation of a ferromagnetic magnetization fixed layer included in the magnetic sensor is coerced.

* * * * *